June 27, 1967  F. C. VOSE  3,328,515
POLYMERIC INSULATOR WITH MEANS FOR PREVENTING
BURNING DUE TO LEAKAGE CURRENT AND ARCS
Filed Aug. 24, 1965  2 Sheets-Sheet 1
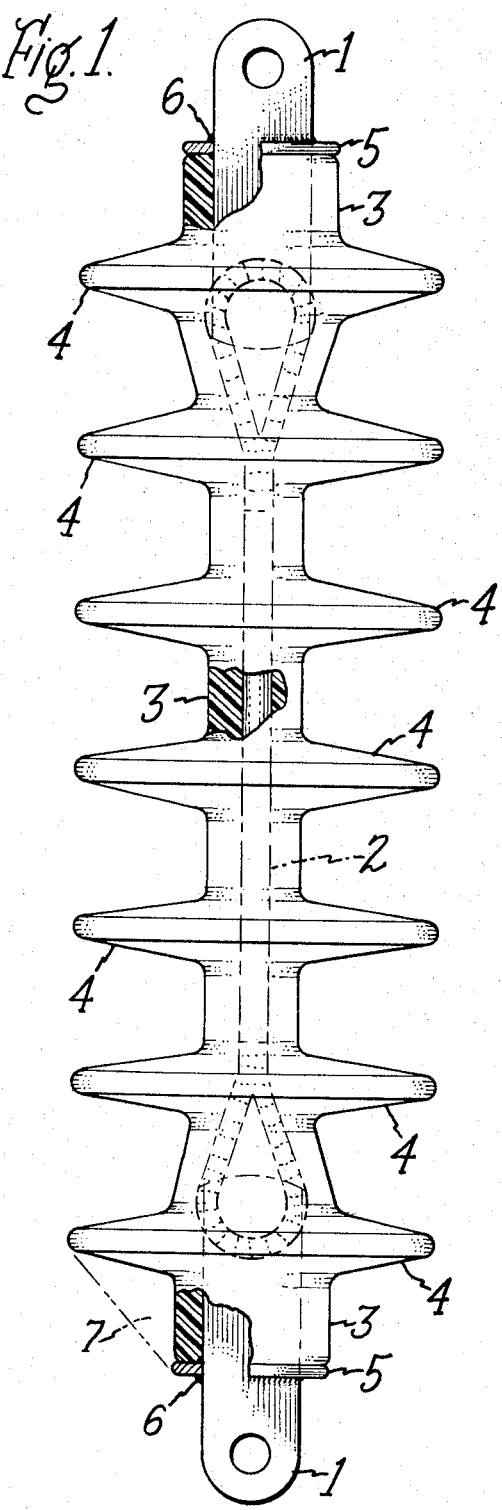
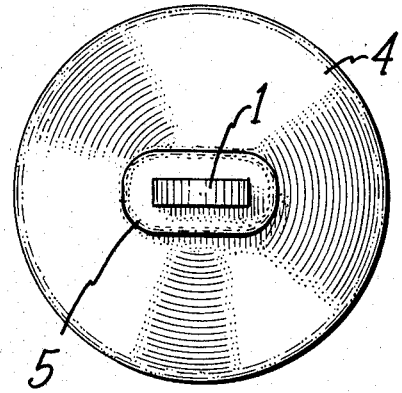
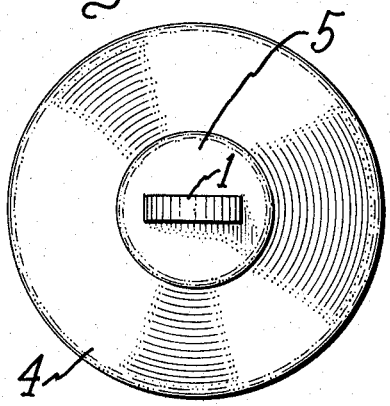
Inventor,
Fred C. Vose,
by Gilbert P. Tarleton
His Attorney.

June 27, 1967 F. C. VOSE 3,328,515
POLYMERIC INSULATOR WITH MEANS FOR PREVENTING
BURNING DUE TO LEAKAGE CURRENT AND ARCS
Filed Aug. 24, 1965 2 Sheets-Sheet 2
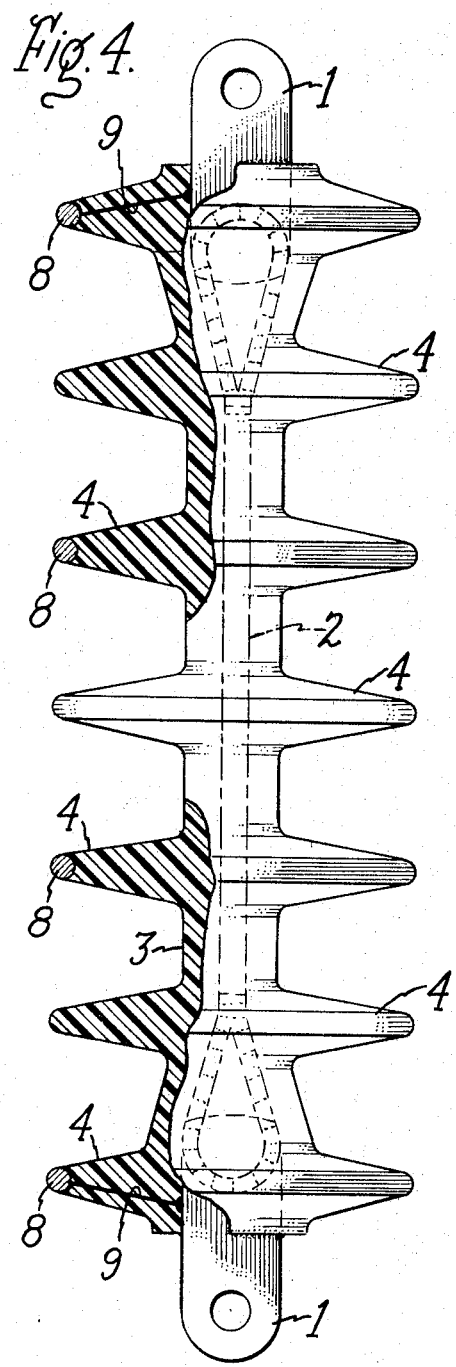
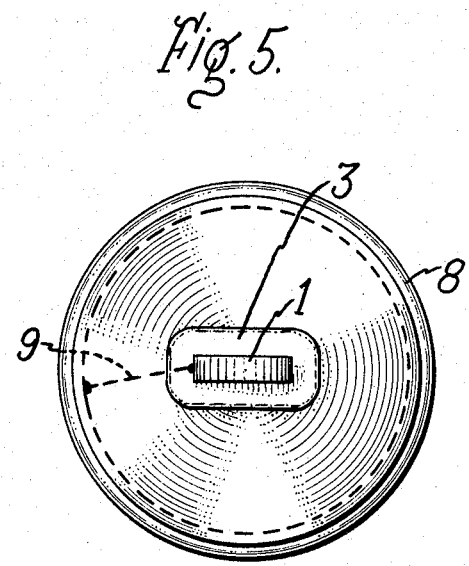
Inventor,
Fred C. Vose,
by Gilbert P. Tarleton
His Attorney.

United States Patent Office 3,328,515
Patented June 27, 1967

3,328,515
POLYMERIC INSULATOR WITH MEANS FOR PREVENTING BURNING DUE TO LEAKAGE CURRENT AND ARCS
Fred C. Vose, Severna Park, Md., assignor to General Electric Company, a corporation of New York
Filed Aug. 24, 1965, Ser. No. 482,095
1 Claim. (Cl. 174—140)

This invention relates to electrical insulators and more particularly to improvements in insulators of the outdoor power transmission or distribution line suspension or strain variety which comprise organic, particularly polymeric, insulating material.

Extensive field tests of such insulators have resulted in a small percentage of failures ultimately due to its surface tracking and/or burning. I believe these failures to be due to concentration of increased leakage current over the surface which has been caused by a coating of air borne contaminants and which coating has been moistened as by fog or light dew so as to reduce the electrical resistance of the surface. By concentration is meant that the leakage current follows a relatively narrow path or paths instead of being distributed uniformly over the surface. I believe that this combination of a concentrated increase in total leakage current causes excessive localized heating which in turn produces the above mentioned ultimate causes of failure.

Accordingly, I have provided leakage current distributing means for such insulators. While such means can take many different forms, it is essentially a narrow metal conductor around the periphery of the insulator for providing an equipotential zone in a plane perpendicular to the axis or lengthwise dimension of the insulator. I have found that such an equipotential circumferential zone tends to distribute leakage current passing through it as it goes over the surface of the insulator and that this greatly improves the reliability of such insulators in service.

An object of the invention is to provide a new and improved electrical insulator.

Another object of the invention is to provide a new and improved strain insulator comprising organic insulating material.

A further object of the invention is to provide means for distributing leakage current over the surface of a polymeric suspension insulator.

The invention will be better understood from the following description taken in connection with the accompanying drawings and its scope will be pointed out in the appended claim.

In the drawings,

FIG. 1 is an elevation view partly in section and partly in phantom of a preferred embodiment of the invention, FIG. 2 is an end elevation view of the insulator shown in FIG. 1, FIG. 3 is a view similar to FIG. 2 of a modification having a round rather than a rectangular or oval leakage current distributing end plate, FIG. 4 is a view similar to FIG. 1 of another modification and, FIG. 5 is an end view partly in phantom of the insulator shown in FIG. 4.

Referring now to the drawings and more particularly to FIG. 1, there is shown therein an outdoor suspension or strain insulator having end hardware fittings 1 connected to the ends of a central core 2 shown in phantom. This core may be made of any suitable material such as glass fibers or particularly a roving thereof formed into a strained carrying rod. Encapsulating the core 2 and the inner ends of the hardware members 1 is a sheath 3 of organic insulating material, for example, cured epoxy resin or other polymeric material. As shown, it is provided with integral rain hoods or petticoats 4. The ends of the sheath 3 are shown flat and generally perpendicular to the longitudinal axis or lengthwise dimension of the insulator.

For distributing leakage current flowing over the surface of the sheath 3 and hoods 4 between the metal hardware members 1 are conductive plates 5 which have a central aperture through which the hardware members 1 extend and which have an outer periphery corresponding or coextensive with the outer periphery of the ends of the sheath 3 as shown most clearly in FIGS. 2 and 3. The plates 5 may, for example, be made of steel and may be welded as at 6 to the hardware members 1. As shown in FIG. 2, the end of the sheath 3 and the shape of the leakage current distributing plates 5 are coextensive and generally rectangular or oval.

By means of this construction, leakage current flowing over the surface of the sheath 3 and hoods 4 will tend to enter or leave the plates 5 through the entire periphery so as to distribute this leakage current over the surface of the sheath 3 and hoods 4.

Another feature of the invention is that the sheath 3 extends beyond the end petticoats 4 a distance of the order of the radial extent of these petticoats so that in the event that an arc is struck between the outer edge of either end petticoat and the adjacent current distributing plate 5 there will be in effect a substantial air pocket indicated generally at 7 so that such arc will not enter or leave the plate 5 near the surface of the sheath 3 and hence will have a greatly reduced tendency to burn the insulation at this point. Such an arc can be struck if the leakage current flowing along the contaminated surface of the insulator heats it enough to dry it out so that its resistance increases with the result that the voltage between the outer edge of the end petticoat 4 and the adjacent metal plate 5 increases enough to strike an arc between those points. While the leakage current distributing elements 5 tend to equalize the voltage in a peripheral or circumferential direction around the insulator at end locations, they have negligible effect on the voltage distribution in the lengthwise or axial direction of the insulator because of their small size and negligible capacitive effects.

In the modification shown in FIGS. 4 and 5, the leakage current distributing means is in the form of a narrow conductive tube or rod 8 embedded in the outer periphery of a petticoat 4. Preferably a number of these means 8 are provided and as shown there is one for each end petticoat and one for each of a pair of intermediate petticoats although they may be provided on all of the petticoats or on a lesser number as required. Preferably the leakage current distributing rings 8 embedded in the end petticoats are conductively connected by a conductor 9 to the adjacent end hardware fitting so as to be maintained at the electrical potential of such fitting. However, the members 8 in the intermediate petticoats are electrostatically floating elements and will have potentials intermediate those of the end hardware fittings but because of the conductive nature of rings 8 that potential will be the same all around the petticoat 4 in which they are embedded. In this manner, leakage current flowing across any member 8 will tend to distribute itself around the insulator because of the conductive nature of the members 8.

If the element 8 in an end petticoat is not connected, as by a conductor 9, to the adjacent end hardware fitting 1, it is preferable to have the sheath 3 extended as in FIG. 1 to provide an air pocket 7 as this will minimize burning of the sheath if an arc strikes between the then electrostatically floating end element 8 and the adjacent hardware fitting 1 even though there is no end leakage current distributing plate 5 as in FIG. 1.

While there have been shown and described particular embodiments of the invention, it will be obvious to those skilled in the art that changes and modifications may be made without departing from the invention, and therefore it is intended by the appended claim to cover all such changes and modifications as fall within the true spirit and scope of the invention.

What I claim as new and desire to secure by Letters Patent of the United States is:

An elongated strain insulator comprising, in combination, a straight strain bearing core of fibrous insulation, metallic hardware members attached to the ends of said core, a sheath of petticoated polymeric insulation around said core in contact with said hardware members, said sheath having flat end surfaces through which said hardware members extend perpendicularly, and metallic leakage current distributing plates covering said flat end surfaces and electrically connected to the respective hardware members which also extend therethrough, the length of the sheath between each leakage current distributing end plate and the closest petticoat being of the order of the radial extent of said petticoat so as to provide substantial air pockets such that an arc struck between the outer edge of either such petticoat and the adjacent leakage current distributing plate will not enter or leave the plate near the surface of the polymeric sheath and hence will have a greatly reduced tendency to burn the insulation at this point.

References Cited

UNITED STATES PATENTS

| 1,247,343 | 11/1917 | Sonneborn | 174—140 |
| 1,991,700 | 2/1935 | Rost | 174—140 |
| 2,732,423 | 1/1956 | Morrison. | |

FOREIGN PATENTS

| 511,124 | 9/1920 | France. |
| 1,129,593 | 9/1956 | France. |

OTHER REFERENCES

General Electric advertisement, Electrical World, vol. 160, No. 5, July 29, 1963, p. 79.

Vose et al.: Electrical Engineering, "A Polymer insulator for high-voltage transmission lines," vol. 82, No. 11. November 1963, pp. 684–688.

LARAMIE E. ASKIN, *Primary Examiner.*